United States Patent [19]
Czekai

[11] Patent Number: 5,298,386
[45] Date of Patent: Mar. 29, 1994

[54] IN-LINE SOLVENT INCORPORATION FOR AMORPHOUS PARTICLE DISPERSIONS

[75] Inventor: David A. Czekai, Honeoye Falls, N.Y.

[73] Assignee: Eastman Kodak Company, Rochester, N.Y.

[21] Appl. No.: 895,922

[22] Filed: Jun. 9, 1992

[51] Int. Cl.$^5$ .............................................. G03C 1/015
[52] U.S. Cl. ..................................... 430/569; 430/377; 430/546
[58] Field of Search ......................... 430/377, 546, 569

[56] References Cited

U.S. PATENT DOCUMENTS

| | | | |
|---|---|---|---|
| 3,801,326 | 4/1974 | Claes | 430/569 |
| 3,850,643 | 11/1974 | Johnson et al. | |
| 3,888,465 | 6/1975 | Terwilliger et al. | 259/4 |
| 4,241,023 | 12/1990 | Wilke et al. | 422/187 |
| 4,309,501 | 1/1982 | Huguenard et al. | 430/569 |
| 4,349,455 | 9/1982 | Yamamura et al. | 252/312 |
| 4,419,441 | 12/1983 | Nittel et al. | 430/377 |
| 4,832,991 | 5/1989 | Hayward et al. | 427/393.5 |
| 4,970,139 | 11/1990 | Bagchi | 430/449 |
| 5,104,776 | 4/1992 | Bagchi et al. | 430/449 |
| 5,104,786 | 4/1992 | Chronis et al. | 430/569 |

Primary Examiner—Charles L. Bowers, Jr.
Assistant Examiner—Mark F. Huff
Attorney, Agent, or Firm—Paul A. Leipold

[57] ABSTRACT

An in-line process for mixing solvents with amorphous particle dispersions is disclosed. Continuous emulsification of the solvent is achieved by an in-line high-shear mixer, and diffusion of solvent to the amorphous particles is controlled in a plug flow reactor. Both processes are conducted in-line during dispersion delivery to coating processes. An apparatus for carrying out the process is also disclosed.

11 Claims, 3 Drawing Sheets

IN-LINE SOLVENT INCORPORATION FOR AMORPHOUS PARTICLE DISPERSIONS

BACKGROUND OF THE INVENTION

1. Field of the Invention

The invention relates to a process and apparatus for preparing solvent-activated amorphous particle dispersions in a continuous process.

2. Information Disclosure

Photographic oil-in-water dispersions are commonly used for the incorporation of materials such as dye-forming couplers, oxidized developer scavengers, dyes and other compounds. Conventional techniques involve dissolving such compounds in organic solvents at high temperatures followed by emulsification of this oil solution into an aqueous gelatin/surfactant solution to form a dispersion. Solvents are used both to facilitate the dissolving of compounds and also to improve photographic activity of compounds by plasticizing the compound, thereby increasing the molecular mobility and lowering the particle bulk glass transition. In some cases, no-solvent (NS) dispersions are prepared by the same approach followed by removal of the solvent by evaporation or washing techniques. The NS dispersion is then considered an amorphous particle dispersion.

Techniques are known for the forming of amorphous-particle dispersions of compounds without the use of solvents. Such techniques are classified as either condensation or dispersion techniques. Modulated Phase Separation (MPS), which is described in U.S. Pat. Nos. 5,104,776 (Bagchi and Sargeant) and 4,970,139 (Bagchi), involves dissolving couplers with acid groups in aqueous alkaline solutions followed by precipitation by reprotonation in the presence of a suitable wetting agent. The resultant dispersion particles are characterized as amorphous and have a size range of 50 to 300 nm.

An alternative technique is disclosed in U.S. Pat. No. 5,110,717 (Czekai) which is incorporated herein by reference. This technique, called a Thermally Modified Solid (TMS) dispersion process, involves preparation of a microcrystalline dispersion of the crystalline compound in a non-solvent liquid (usually water) with suitable wetting agents. The amorphous dispersion is obtained by mechanical fragmentation followed by heating or pressurized heating of the dispersion to the melting temperature of the dispersed crystals, at which temperature the microcrystals undergo a phase change and are converted to amorphous particles of a size range of 10-500 nm. These amorphous particles have properties that render them more desirable than microcrystalline particles for certain photographic uses; therefore, recrystallization subsequent to the formation of the amorphous particles is to be avoided.

In the case where the amorphous particles are dye forming couplers, it is known that the addition of a separate non-aqueous solvent to the pre-formed aqueous coupler dispersion results in increased photographic activity. This phenomenon has been observed for conventional NS (no-solvent) dispersions and for MPS dispersions. The solvent is thought to partition by diffusion through the aqueous phase to the coupler particle which it then plasticizes. The increased photographic activity lasts only as long as the particles remain amorphous, and unfortunately the solvent not only plasticizes the amorphous particles, it also increases their tendency to recrystallize.

One advantage of the solvent-free, aqueous amorphous particle dispersion is the improved stability against recrystallization of the amorphous particles. In general, in the absence of non-aqueous solvent, the dispersions retain their sensitometric properties for relatively long periods of storage. However, once a solvent is introduced, storage stability declines sharply. The prolonged presence of solvent in the amorphous particle dispersion appears to increase susceptibility of the plasticized particle to recrystallization. There is a "window" of time during which the photographic activity of amorphous particle dispersions is improved by the presence of solvent. This is a particular problem in coating delivery processes where the dispersion is held at elevated temperatures for many hours.

There is thus a need for an in-line process that would produce a solvent-activated amorphous particle dispersion in a continuous mode.

It is therefore an object of the invention to provide a process that can be used to produce an optimally active amorphous particle dispersion.

It is a further object to provide a process that can be run continuously, rather than batchwise.

It is a further object to provide a process for amorphous particle dispersions that minimizes recrystallization of plasticized particles.

It is a further object to provide an in-line process for the addition of solvents to amorphous particle dispersions that eliminates the need for a separate solvent dispersion manufacturing operation.

It is a further object to provide an in-line process that enables the automated, continuous delivery of dispersion, gelatin and solvent solutions to coating processes, thereby improving productivity.

SUMMARY OF THE INVENTION

In one aspect the invention relates to a process for preparing a solvent-activated amorphous particle dispersion in a continuous process comprising the steps of:
(a) introducing an amorphous particle dispersion into a high-shear mixer;
(b) simultaneously introducing into said high-shear mixer a flow of activating solvent;
(c) mixing said dispersion and said activating solvent under continuous-flow conditions to produce an emulsion;
(d) conveying said emulsion to a plug-flow reactor; and
(e) providing a controlled residence time in said reactor for said dispersion and said solvent to achieve a uniform degree of diffusion.

The preferred amorphous particle dispersion is a dispersion of a photographic coupler in water.

In a further aspect the invention relates to a process wherein either the amorphous particle dispersion additionally includes a peptizing agent, preferably gelatin, or the activating solvent additionally includes a peptizing agent, preferably gelatin, so that the final product is a photographic emulsion comprising a solvent-activated amorphous particle dispersion and a peptizing agent.

In a further aspect the invention relates to a process as above additionally comprising the step of coating the solvent-activated dispersion onto a photographic substrate directly from the outlet of the plug-flow reactor.

DESCRIPTION OF PREFERRED EMBODIMENTS

An improved process for solvent addition to amorphous particle dispersions is provided which enables solvent diffusion while minimizing delivery system residence times of plasticized particles prior to coating and drying processes. This process also eliminates the need for a separate manufacturing process for solvent dispersion or solvent loaded latex dispersion preparation.

Critical elements of this process are (1) in-line high-shear mixer(s), and (2) an in-line plug-flow reactor. The in-line mixer provides emulsification of the solvent into an aqueous stream, which maximizes solvent surface area and diffusion. This mixer may also be used to mix the dispersion and gel, dispersion and solvent or dispersion, gel and solvent together. The plug flow reactor allows a controlled residence time of the amorphous dispersion and solvent in order to achieve the required degree of diffusion. It also can be used to minimize such residence times to avoid recrystallization of the plasticized particles.

In-line mixing of amorphous particle dispersions, gelatin and solvents can be accomplished by several different configurations, as shown in FIGS. 1-4. The preferred approach will depend on materials and process factors.

Figure 5:
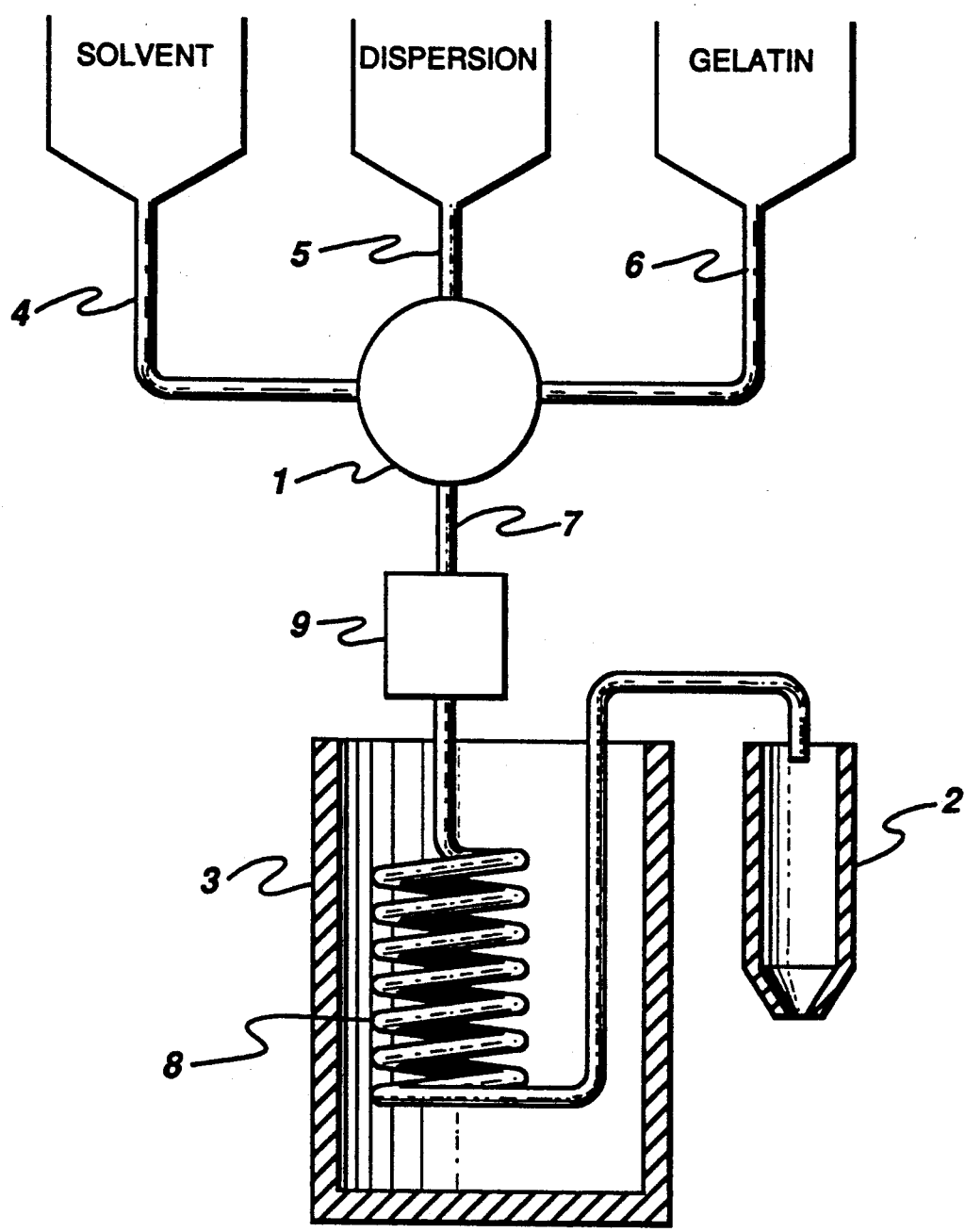
FIG. 5 is a schematic diagram of an apparatus according to the invention.

As shown in FIG. 5, a solvent, an amorphous particle dispersion and a solution of peptizing agent (gelatin in this case) are introduced into a high-shear mixer 1 through conduits 4, 5 and 6. In the preferred process, the amorphous particle dispersion is an aqueous dispersion of a photographic coupler. Couplers are dye image-forming compounds which form a dye by reacting with an oxidation product of color developing agents, for example, aromatic amines (generally, primary amines). It is generally preferred that the couplers are non-diffusible, having a hydrophobic group called a ballast group in the molecule. They may be 4-equivalent or 2-equivalent with respect to a silver ion. The couplers may be colored couplers having a color correction effect and the so-called DIR couplers which release a development inhibitor upon development as well as conventionally recognized cyan, magenta, and yellow couplers. Another preferred process utilizes preformed dyes in the amorphous particle dispersion. The dispersions may additionally contain scavengers.

The activating solvents are water-immiscible, high-boiling organic compounds, which are chosen for their compatibility and activity. Typical solvents are 2-(2-butoxyethoxy)ethyl acetate (butyl carbitol acetate), bis(10, 11-epoxyundecyl)phthalate, bis(2-4-t-butylphenyl)isophthalate, mixtures of tricresyl phosphates, di-n-butyl phthalate, N-n-amylphthalimide, bis(2-methoxyethyl)phthalate, ethyl N,N-di-n-butylcarbamate, diethyl phthalate, n-butyl 2-methoxybenzoate, bis(2-n-butoxyethyl) phthalate, diethyl benzylmalonate, guaiacol acetate, tri-m-cresyl phosphate, ethyl phenylacetate, phorone, di-n-butyl sebacate, N,N-diethyl lauramide, dioctyl phthalate, cresyl diphenyl phosphate, butyl cyclohexyl phthalate, tetrahydrofurfuryl adipate, guaiacol n-caproate, bis(tetrahydrofufuryl) phthalate, N,N,N',N'-tetraethyl phthalamide, N-n-amylsuccinimide, triethyl citrate, 2,4-di-n-amylphenol and 1,4-cyclohexylenedimethylene bis(2-ethylhexanoate). Preferred solvents are butyl carbitol acetate, tricresyl phosphate and dibutyl phthalate.

Peptizing agents are proteins such as gelatin, gelatin derivatives, graft polymers of gelatin and other high molecular weight materials, albumin or casein, saccharides such as cellulose and cellulose derivatives like hydroxyethyl cellulose, carboxymethyl cellulose or cellulose sulfates, sodium alginate or starch derivatives, and many synthetic hydrophilic high molecular substances such as homo-or copolymers of polyvinyl alcohol, polyvinyl alcohol semiacetal, poly-N-vinylpyrrolidone, polyacrylic acid, polymethacrylic acid, polyacrylamide, polyvinylimidazole or polyvinylpyrazole.

Gelatin is preferred. It may be lime treated gelatin, acid treated gelatin, or enzyme treated gelatin as described in Bull. Soc. Sci. Phot. Japan, No. 16, p. 30 (1966). Further, hydrolysis products and enzymatic decomposition products of gelatin can also be used. Suitable gelatin derivatives may be produced by reacting gelatin with various compounds such as acid halides, acid anhydrides, isocyanates, bromoacetic acid, alkanesulfones, vinyl sulfonamides, maleimides, polyalkylene oxides or epoxy compounds. Graft polymers of gelatin with homo- or copolymers of vinyl monomers such as acrylic acid, methacrylic acid, esters and amide derivatives thereof, acrylonitrile or styrene are also suitable.

The dispersion, the solvent or the peptizing agent may contain emulsifying agents, surfactants, antiseptics or other additives well-known in the photographic art.

In order to disperse photographic additives in an aqueous system, various kinds of mixers can be effectively used. Static mixers are generally unsuitable; active, in-line mixers are preferred. Specific examples of dispersing machines which can be used in this invention include a high speed agitator, a ball mill, a colloid mill, an attriter, or an ultrasonic dispersing machine. The preferred dispersing machines are so-called high-shear mixers, which commonly operate at 2000 to 20000 rpm with rotor tip speeds of 1-100 m/sec.

Examples of high-shear mixers that can be used in this invention include those having a dissolver constructed of one or more impellers fitted around one vertical shaft, and those having a multi-shaft dissolver fitted with plural vertical shafts. Besides the high-shear mixers equipped with dissolvers alone, high-shear mixers having both a dissolver (rotor) and an anchor wing (stator) are employed to greater advantage. A typical commercial high-shear mixer suitable in the apparatus of the invention is the Krupp Industrie Technik S-10 available from Krupp AG (Germany).

From the high-shear mixer 1 the mixture is conveyed through conduit 7 to plug-flow reactor 8 and thence to an emulsion spreader 2 by pump means 9. The pump means may be multiple piston metering pumps, gear pumps, centrifugal pumps, progressive cavity pumps, peristaltic pumps, diaphragm pumps or in general any of the means known in the art for inducing a controlled flow of fluid through the system.

The plug-flow reactor is a reactor in which backward and forward mixing are minimized. In the ideal reactor each particle would be exposed to solvent for exactly the same length of time. Plug-flow reactors suitable for use in the apparatus of the invention are often in the form of extended coils of tubing so that there is appropriate residence time for plasticization but not for re-crystallization. Contact time is precisely manipulated by adjusting the flow rate and the length of the path in the plug-flow reactor. The reactor may be provided with conventional means for maintaining a constant temperature 3.

A preferred plug flow reactor is a pipe with a flow such that it has a Reynolds number of greater than 5,000. It is preferred that the Reynolds number be greater than 10,000 for most uniform plasticization. It is preferred that the residence time distribution of the plug flow reactor be below 1.30 and preferably below 1.25. If flow is not high enough laminar flow may take place, in which case the middle portion of the material will move ahead of the edge portion. On the other hand, when turbulent plug flow is taking place the material on the cross-section of the pipe will move through the pipe at a substantially equal rate and will be minimally mixed with material forward or behind it. Thus, circulation may take place perpendicular to the direction of movement without changing the history of each grain.

Residence time distribution in a continuous system is the distribution function of the times required by all particles to travel from one particular point to another. In an ideal plug-flow system, all particles will take the same amount of time, and the residence time distribution will be a tall spike. In a back-mixed system, some particles will travel slowly, some quickly, and the residence time distribution will be broad. The geometric standard deviation of the residence times of all particles through the system is a measure of the width of that peak, and thus, is an indicator of the degree of plug-flow behavior of the system. Since a geometric standard deviation is dimensionless, it allows valid comparison between systems with different mixing patterns and mean residence times.

The following standard formulas may be used to determine the residence time distribution of the inventive process. The formula for geometric standard deviation is suitable where there is a large number of particles:

$$\text{Geometric mean} = tg \tag{1}$$

$$t_g = \exp\left[\frac{\sum\limits_{i}^{n} \ln t}{n}\right]$$

t = particle resident time
n = number of particles $$\text{Geometric standard deviation} = SD \tag{2}$$

-continued $$SD = \exp\sqrt{\frac{\sum\limits_{i}^{n} (\ln t)^2}{n} - (\ln tg)^2}$$

t = particle number
n = number of particles

Example 1

Figure 1:
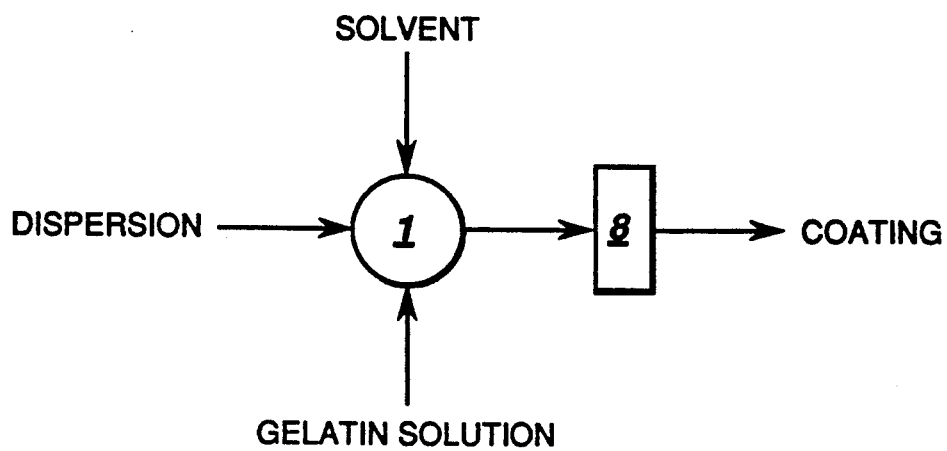
FIG. 1 is a schematic diagram of one embodiment of the process of the invention wherein solvent, dispersion, and gelatin are all fed into one high-shear mixer.
Figure 2:
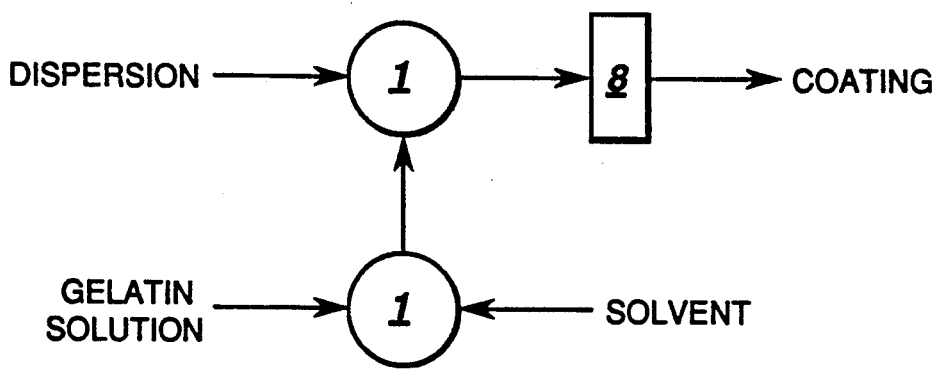
FIG. 2 is a schematic diagram of a second embodiment of the process of the invention wherein gelatin and solvent are mixed first and then introduced into the dispersion.
Figure 3:
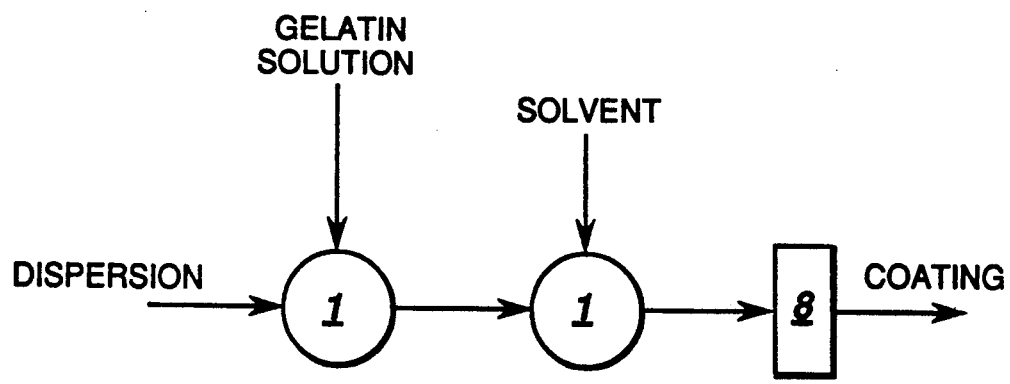
FIG. 3 is a schematic diagram of a third embodiment of the process of the invention wherein dispersion and gelatin are mixed first and then introduced into the solvent.
Figure 4:
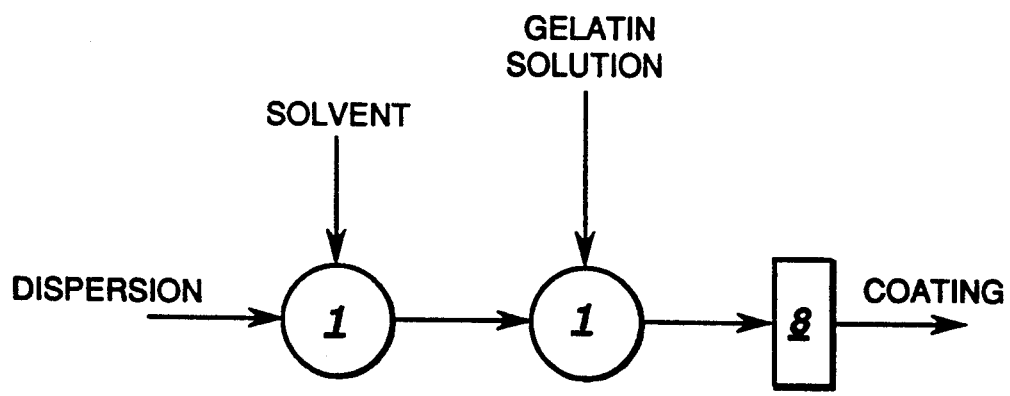
FIG. 4 is a schematic diagram of a fourth embodiment of the process of the invention wherein solvent and dispersion are mixed and then introduced into the gelatin.

An apparatus having the configuration shown in FIG. 2 is used to prepare an activated amorphous fine particle dispersion as follows: the amorphous coupler dispersion comprises a 10% by weight dispersion of coupler in water at 40° C. containing 0.35% anionic surfactant. The amorphous coupler dispersion is provided into the high shear mixer at a flow rate of 1 kg per minute. The solvent stream comprises a 1:1 mixture of dibutyl phthalate and butylcarbitol acetate which is furnished into the second high shear mixer at 50 g per minute and 40° C. The gelatin solution is provided as a 21% by weight solution of gelatin in water containing 0.37% anionic surfactant. It is furnished at 40° C. and 950 g per minute. After mixing and aging, the activated dispersion is combined with water and any other conventional additives to provide a coating solution which comprises 5% coupler, 10% gel and 2.5% activating solvents. The coating solution is provided to the substrate at 2 kg per minute on a continuous basis.

The high shear mixer is a Krupp model S100. The plug flow reactor is a stainless, tubular coil having inside diameter of 2 cm and a length of 31.8 m formed into a coil 1.2 m high by 50 cm in diameter. The resulting plug flow reactor has a working volume of 10 L and, at a flow rate of 2 L per minute, provides an average residence time of 5 minutes.

The amorphous coupler dispersion is prepared by conventional processes without gelatin. The solvent mixture is emulsified into the gelatin resulting in 0.1 to 0.5 µ solvent dispersion. The solvent emulsion and coupler dispersion are mixed in a second high shear mixer, and the combined solutions are delivered to a plug flow reactor where the five minute residence time allows for diffusion of the solvent to the coupler particles resulting in homogenous coupler-solvent particles. Equilibrium solution is delivered to the coating process.

While the invention has been particularly shown and described with reference to preferred embodiments thereof, it will be understood by those skilled in the art that other changes in form and details may be made therein without departing from the spirit and scope of the invention.

We claim:

1. A process for preparing a solvent-activated amorphous particle dispersion of a photographic coupler or dye in a continuous process comprising the steps of:
    (a) introducing an amorphous particle dispersion of a photographic coupler or dye into a high-shear mixer;
    (b) simultaneously introducing into said high-shear mixer a flow of activating solvent;
    (c) mixing said dispersion and said activating solvent under continuous-flow conditions to produce an emulsion:
    (d) conveying said emulsion to a plug-flow reactor; and (e) providing a controlled residence time in said reactor for said dispersion and said solvent to achieve a uniform degree of diffusion.

2. A process according to claim 1 further characterized in that said amorphous particle dispersion additionally includes a peptizing agent.

3. A process according to claim 2 wherein said peptizing agent is gelatin.

4. A process according to claim 1 further characterized in that said activating solvent additionally includes a peptizing agent.

5. A process according to claim 4 wherein said peptizing agent is gelatin.

6. A process according to claim 1 further characterized in that said activating solvent is chosen from the group consisting of butyl carbitol acetate, tricresyl phosphate and dibutyl phthalate.

7. A process according to claim 1 additionally comprising the step of coating said solvent-activated dispersion onto a photographic substrate directly from said plug-flow reactor.

8. A process according to claim 1 wherein said controlled residence time in said reactor is about five minutes.

9. A process for preparing a solvent-activated amorphous particle dispersion of a photographic coupler or dye in a continuous process comprising the steps of:
  (a) introducing an amorphous particle dispersion of a photographic coupler or dye into a high-shear mixer;
  (b) simultaneously introducing into said high-shear mixer a flow of activating solvent:
  (c) simultaneously introducing into said high-shear mixer a flow of peptizing agent;
  (d) mixing said dispersion, said activating solvent and said peptizing agent under continuous-flow conditions to provide an emulsion;
  (e) conveying said emulsion to a plug-flow reactor; and
  (f) providing a controlled residence time in said reactor for said dispersion and said solvent to achieve a uniform degree of diffusion.

10. A process according to claim 9 wherein said peptizing agent is gelatin.

11. A process according to claim 9 wherein said controlled residence time in said reactor is about five minutes.

* * * * *